United States Patent
Tao et al.

(10) Patent No.: US 7,222,014 B2
(45) Date of Patent: May 22, 2007

(54) METHOD FOR AUTOMATIC TRACTION CONTROL IN A HYBRID ELECTRIC VEHICLE

(75) Inventors: Xuefeng T. Tao, Northville, MI (US); Todd M. Steinmetz, Indianapolis, IN (US); Tung-Ming Hsieh, Carmel, IN (US); William R. Cawthorne, Milford, MI (US)

(73) Assignee: General Motors Corporation, Detroit, MI (US)

( * ) Notice: Subject to any disclaimer, the term of this patent is extended or adjusted under 35 U.S.C. 154(b) by 558 days.

(21) Appl. No.: 10/846,016

(22) Filed: May 14, 2004

(65) Prior Publication Data

US 2005/0256629 A1 Nov. 17, 2005

(51) Int. Cl.
*G06F 7/00* (2006.01)
(52) U.S. Cl. .............................. 701/87; 701/84; 701/82; 180/197
(58) Field of Classification Search .................. 701/87, 701/84, 82, 101, 110, 70, 78, 81, 89, 90; 290/40 R, 40 A, 40 B, 40 C, 45, 51; 477/187, 477/188; 180/197, 65.1–65.8; 303/162, 303/185, 140, 146, 122, 113.2, 138, 139
See application file for complete search history.

(56) References Cited

U.S. PATENT DOCUMENTS

| | | | |
|---|---|---|---|
| 5,492,192 A | | 2/1996 | Brooks et al. |
| 6,078,859 A | * | 6/2000 | Jastrzebski et al. ........... 701/93 |
| 6,182,002 B1 | | 1/2001 | Bauerle et al. |
| 6,473,683 B1 | * | 10/2002 | Nada ............................ 701/82 |
| 7,050,899 B2 | * | 5/2006 | Masters et al. ............... 701/84 |

* cited by examiner

Primary Examiner—Richard M. Camby
(74) Attorney, Agent, or Firm—Christopher DeVries

(57) ABSTRACT

A method for providing traction control in vehicle powertrain systems is particularly adapted for traction control in a powertrain system of a hybrid electric vehicle comprising an internal combustion engine, an electric machine and a transmission that is operatively coupled to the electric machine and the engine and adapted to provide a transmission torque output in response to a transmission torque input received as a torque output from either or both of the engine and the electric machine. The method is adapted to utilize conventional traction control and engine control hardware, software and communication standards to implement traction control. In one embodiment of the invention, a conventional traction controller is used to detect a wheel spin condition and provide a plurality of first output torque command messages in response thereto. The plurality of first output torque command messages are used to obtain a torque reduction which is applied to a reference output torque to obtain a corresponding plurality of traction control output torque commands for the powertrain system during the wheel spin condition. A rate limit may also be applied to control the rate of change between successive ones of the traction control output torque commands in order to reduce the possibility of extension of the wheel spin condition, or recurrence of another wheel spin condition. Each traction control output torque command may be used to determine an associated traction control engine torque output command and traction control electric machine torque output command.

25 Claims, 10 Drawing Sheets

METHOD FOR AUTOMATIC TRACTION CONTROL IN A HYBRID ELECTRIC VEHICLE

TECHNICAL FIELD

The present invention is generally related to a method for providing traction control for a vehicular powertrain system. More particularly, the present invention is related to a method of providing automatic traction control for a powertrain system of a hybrid electric vehicle.

BACKGROUND OF THE INVENTION

Automatic traction control systems have been developed for automotive vehicles as a stability enhancement feature, and generally operate to reduce wheel torque in response to a detected wheel spin condition. A number of different approaches have been developed to affect control of a number of different variables in order to carry out the torque reduction, including the control of engine fueling, spark retard, and throttle, as well as various types of brake controls. In general, detection of the wheel spin condition is achieved by precisely monitoring the speeds of the driven wheels and comparing them with the speeds of un-driven wheels or a vehicle reference speed.

In conventional heavy-duty vehicles, traction control is commonly achieved using a form of engine torque output control. When a wheel-spin condition is detected, an automatic traction control (ATC) controller sends an engine torque reduction request via a data communication bus to an engine control module (ECM), such as a message sent via a Society of Automotive Engineers (SAE) J1939 controller area network (CAN) data link using the corresponding communication protocols. The SAE J1939 communication standards are commonly used in heavy-duty vehicles, and ATC controllers, engine controllers and data communication buses are commercially available that implement these standards. References herein to SAE J1939, and more specifically SAE J1939-71 "Vehicle Application Layer", are based upon the Draft for Ballot dated Jun. 5, 1999.

Automatic traction controls for hybrid electric vehicles (HEV), such as heavy-duty trucks or buses, are not yet standardized and widely available, as such vehicles have limited commercial availability and widely varying powertrain systems and architectures. Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for a wide range of operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and multi-mode operation. Such powertrain systems are well adapted to control the output torque of the drivetrain, and thereby to implement automatic traction control. However, control methods and algorithms for implementing automatic traction control in hybrid electric vehicles, particularly those having EVT powertrain systems are needed.

Therefore, it is desirable to develop a method for providing automatic traction control in the powertrain systems of hybrid electric vehicles, particularly those having transmissions comprising an EVT. It is also particularly desirable to utilize existing communication standards, such as the SAE J1939 standard, as well as existing hardware and software that implement such standards, to implement a method for providing automatic traction control.

SUMMARY OF THE INVENTION

The present invention is a method of providing automatic traction control for a vehicle powertrain system, particularly the vehicle powertrain system of a hybrid electric vehicle, and more particularly a powertrain system comprising an EVT.

The method is particularly advantageous for providing traction control of a vehicle powertrain system comprising an internal combustion engine, an electric machine or machines, a transmission that is operatively coupled to the electric machine and the engine and adapted to provide a transmission torque output in response to a transmission torque input received as a torque output from either or both of the engine and the electric machine. The powertrain system also includes a system controller that is adapted to determine a desired output torque and control an output torque of the transmission therewith, a traction controller that is adapted to detect a wheel spin condition and provide a plurality of first output torque command messages in response thereto, and a controller bus that is adapted to provide the plurality of first output torque command messages from the traction controller to the system controller.

The method generally comprises a step of monitoring a vehicle powertrain system for a wheel spin condition using a first controller, such as a traction controller. If a wheel spin condition is detected, the method includes a step of sending a plurality of first output torque command messages from the first controller to a second controller, such as the system controller, that is adapted to determine a desired output torque, preferably over a controller bus. The method also includes a step of determining a reference output torque using the desired output torque, and a step of determining a plurality of traction control output torque commands corresponding to the plurality of first output torque command messages as a function of the reference output torque. The final step of the method includes controlling a torque output of the vehicle powertrain system based on the plurality of traction control output torque commands.

The method is particularly advantageous in that it may be implemented using existing communication standards, such as the SAE J1939 standard, as well as existing hardware and software, such as automatic traction control modules and engine control modules that implement such standards, to provide automatic traction control of a hybrid electric vehicle powertrain system. This method is also particularly advantageous in that a traction control output torque is calculated that may be used to control the output torque of the transmission, including output torque contributions from both an engine and an electric machine or machines. This is an improvement over related art traction control systems that are adapted to control the output torque of an engine only. The present invention is also advantageous in that it is adapted to provide a faster torque response to a wheel spin condition than related art engine-only traction controls due to the generally faster torque response associated with electric machines.

BRIEF DESCRIPTION OF THE DRAWINGS

The present invention will be more fully understood from the accompanying drawings, in which.

DESCRIPTION OF THE PREFERRED EMBODIMENT

Figure 1:
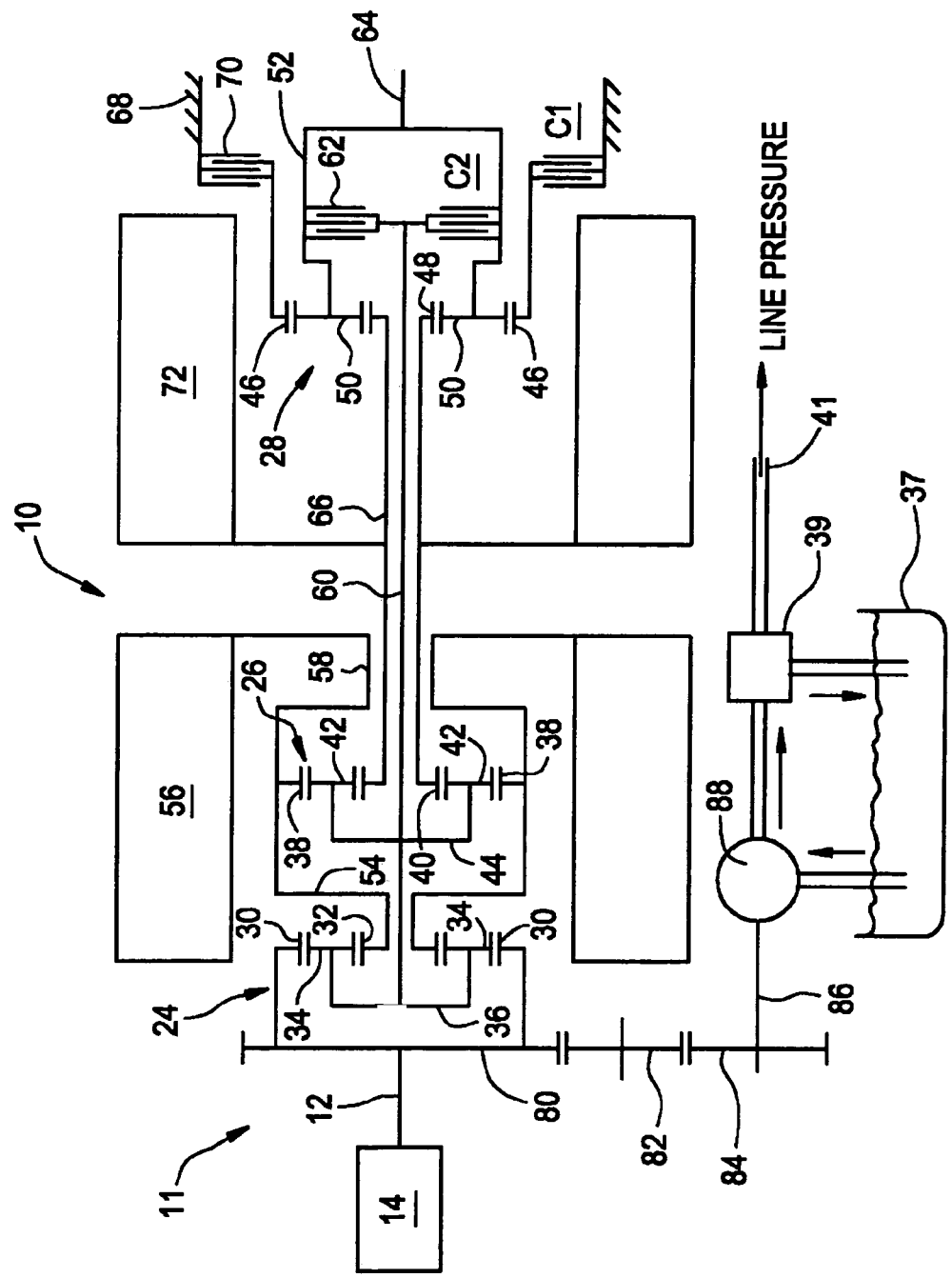
FIG. 1 is a mechanical hardware schematic representation of one preferred form of a two-mode, compound-split, electrically variable powertrain system particularly suited to the control of the present invention.
Figure 2:
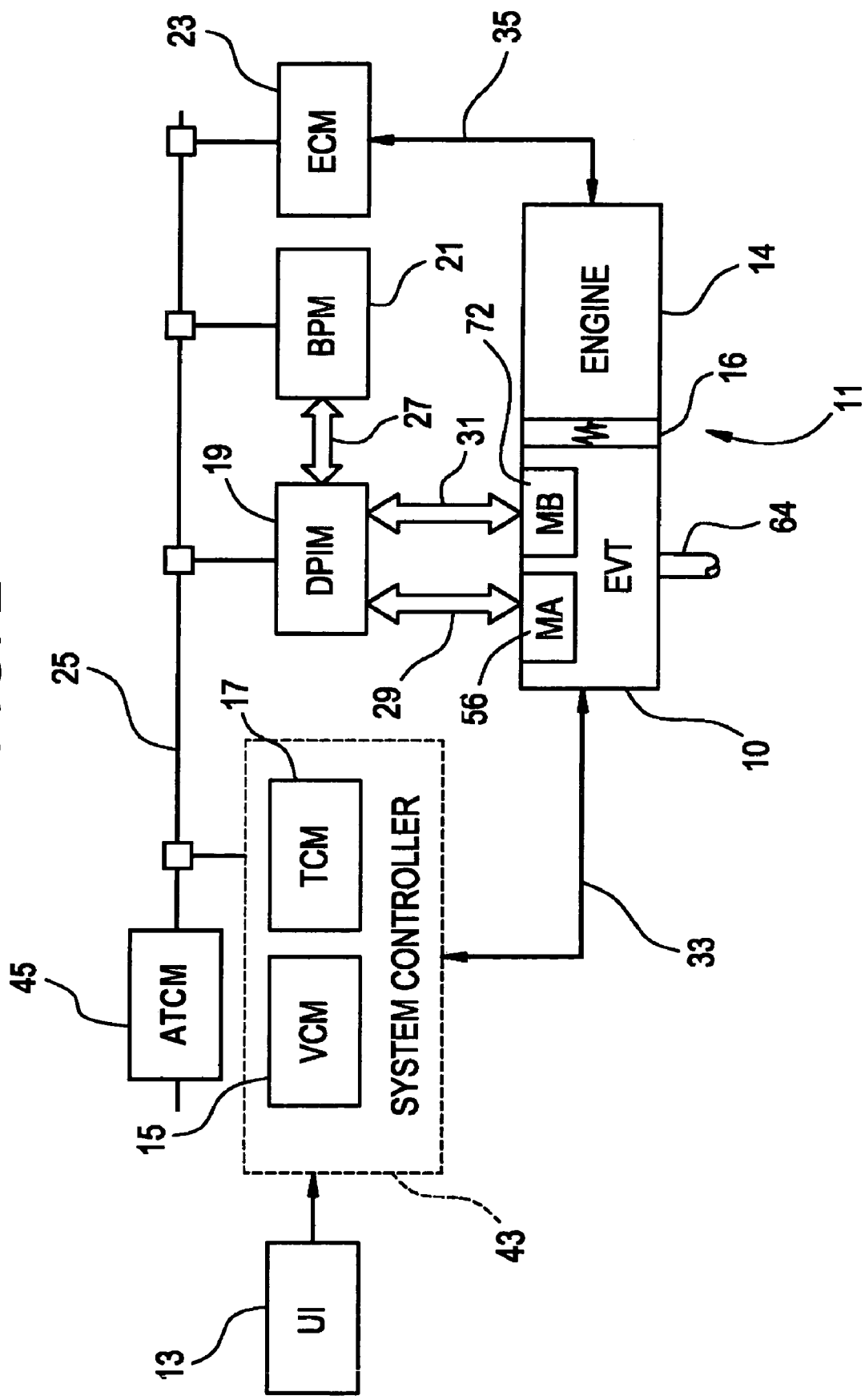
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those FIGS., the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be an internal combustion engine, such as a diesel engine, which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may comprise either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump 88 and which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well-known torque-based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description, the EVT 10 selectively receives power from the engine 14. As will now be explained with continued reference to FIG. 2, the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 land provides current to the DC lines 27. The net DC current provided to or from the inverters determines the charge or discharge operating mode of the BPM 21. Preferably, MA and MB are three-phase AC electric machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor-based controllers designated as vehicle control module (VCM) 15 and transmission control module (TCM) 17. VCM 15 and TCM17 may provide, for example, a variety of control and diagnostic functions related to EVT and vehicle chassis including, for example, engine torque commands, input speed control, and output torque control in coordination with regenerative braking, anti-lock braking and traction control, as described herein. Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e., system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example, the preferred protocol for heavy duty applications is the Society of Automotive Engineers standard J1939 (SAE J1939). The CAN bus and appropriate protocols provide for robust messaging and multi-controller interfacing between the system controller, ECM, DPIM, BPIM and other controllers such as antilock brake and traction controllers, illustrated as automatic traction control module (ATCM) 45.

Figure 3:
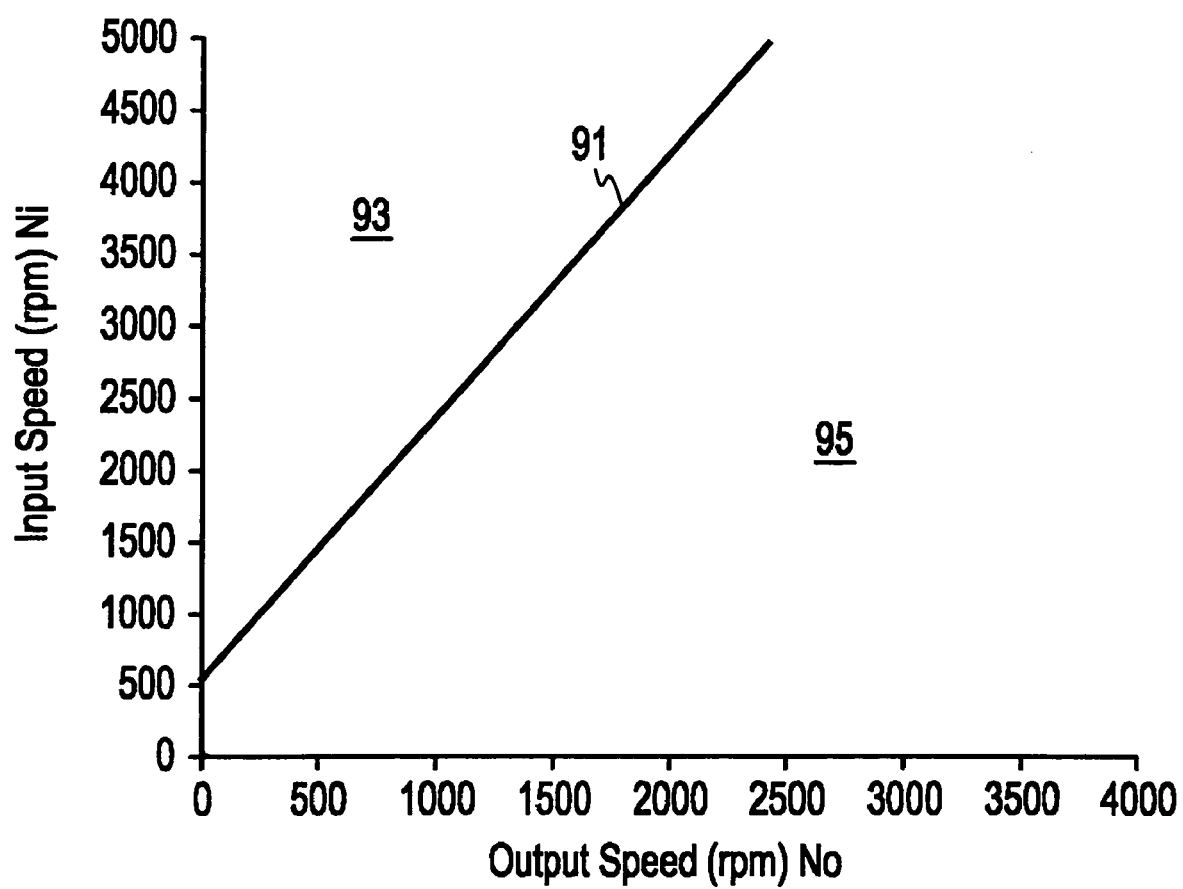
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross, is represented by line 91. As such, it represents the input and output speed relationships substantially whereat synchronous shifting from between modes can occur or whereat direct mechanical coupling from input to output can be affected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g., mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g., mass, size, cost, inertial capabilities, etc.) to the high speeds of region 93. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

For transmission speed control during MODE 1 and MODE 2, the dynamic equations for the EVT are determined using Newton's law applicable to rotating bodies:

$$N\_dot = (1/J) * T\text{sum}$$

where

N_dot is rotational acceleration;

J is rotational inertia; and,

Tsum is summation of external torques acting upon inertia J.

In the exemplary EVT, the following matrix equations, determined using Newton's law for each independent free body diagram, correspond to MODE 1 and MODE 2, respectively:

$$[Ni\_dot\ No\_dot]^T = [A1] * [Ti\ Ta\ Tb\ To]^T$$

$$[Ni\_dot\ No\_dot]^T = [A2] * [Ti\ Ta\ Tb\ To]^T$$

where

Ni_dot is input member acceleration;

No_dot is output member acceleration;

Ti is externally applied input member torque;

Ta is externally applied motor A torque;

Tb is externally applied motor B torque;

To is externally applied output member torque; and,

A1 and A2 are 2×4 matrices of parametric values determined by the hardware gear and shaft interconnections and estimated hardware inertias applicable to MODE 1 and MODE 2, respectively.

Other different independent member accelerations may be substituted for those shown above to arrive at similar matrix equations. Ni_dot and No_dot are selected as expedient since both input and output speed are quantities of general interest in other areas of the transmission and vehicle controls.

The matrix equation form is identical for MODE 1 and MODE 2. The parametric constants in A1 and A2, however, may differ. Therefore, further references herein to either MODE 1 or MODE 2 shall be equally applicable to the other.

This basic mode model of the system to be controlled provides the basis for transmission input speed control in accordance with the present invention. For the exemplary EVT, it is preferred to perform input speed control via motor torques Ta and Tb and not via the input torque Ti at the input member or via the output torque To at the output member. Thus, Ti and To are both considered as external input or disturbance torques not subject to control by the present invention. Therefore, the basic mode model is rearranged into a matrix equation for solving for motor torques Ta and Tb as follows:

$$[Ta\ Tb]^T = [B1] * [Ti\ To\ Ni\_dot\ No\_dot]^T$$

where B1 is a 2×4 matrix of parametric values determined by the hardware gear and shaft interconnections and estimated hardware inertias applicable to MODE 1 and represents what is commonly referred to as the plant model.

This modified mode model is utilized in the EVT speed control of the present invention. The motor torque commands are calculated based upon the plant dynamic model parameters, B1, and specially formulated inputs (Ti, To, Ni_dot, No_dot) to the model. The choices of application for each of these specially formulated inputs are described below.

Figure 4:
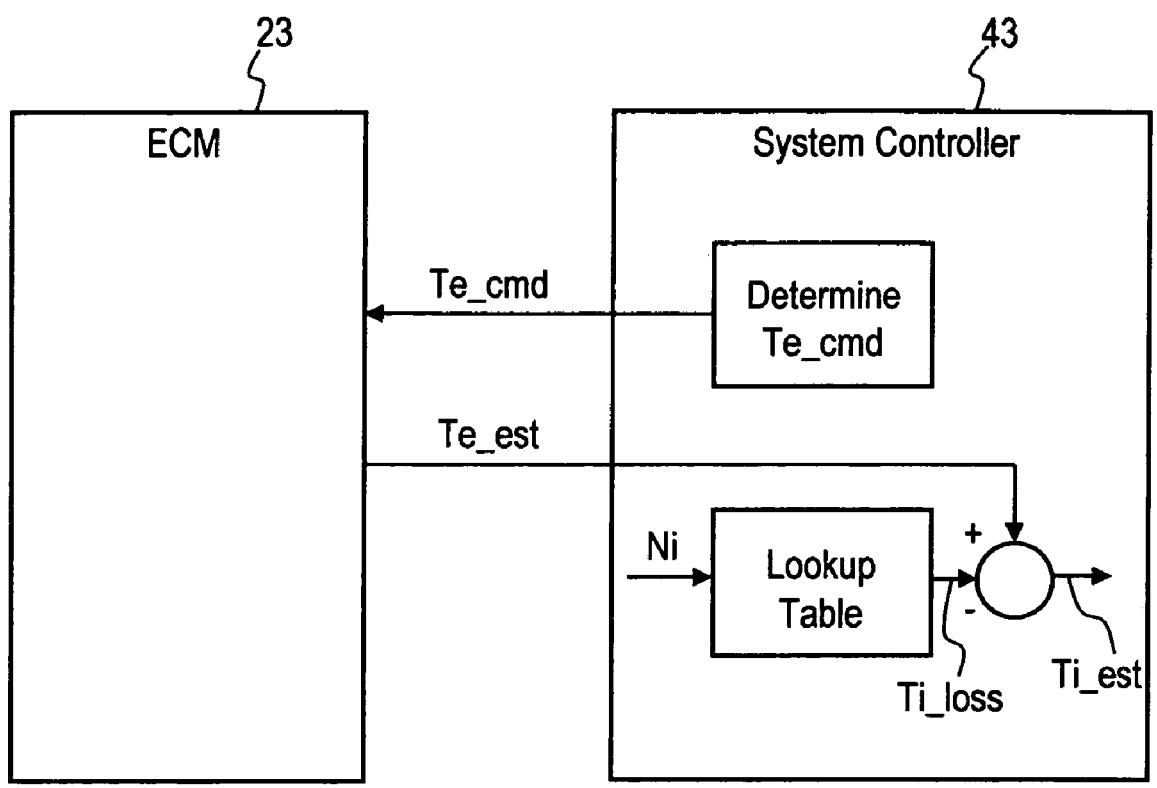
FIG. 4 is a block diagram of EVT input member torque estimation for use in the input speed control of the present invention.

The preferred implementation for input member torque Ti is to provide an estimated input torque, Ti_est, for Ti. FIG. 4 provides a block diagram of the method by which estimated input torque Ti_est is determined. An engine torque command, Te_cmd is provided to ECM 23 by the system controller 43. The ECM 23 then provides an estimate of the actual engine torque produced, Te_est, which is provided to the system controller 43. The system controller 43 then calculates an estimate of torque losses to the input member, Ti_loss, through the use of an empirically defined lookup table which is a function of input member speed, Ni. These empirically defined losses represent reductions in torque produced by the engine due to friction, transmission pump losses, engine driven accessories, etc. The engine's estimate of torque produced is then reduced by the loss estimate to calculate the estimated input torque, Ti_est. Through Ti_est, Ta and Tb are calculated in such a manner as to account for and counteract the effects of estimated transmission input torque on transmission input speed.

The preferred implementation for output member torque To is to provide a desired output torque to be produced by the transmission, To_des for To. In the modified model utilized in the EVT input speed control described herein, To is considered an external torque acting upon the output member. The external output torque is assumed equal and opposite to the EVT produced output torque and hence To is equated to To_des. The determination of To_des is made based upon several factors such as driver inputs of accelerator pedal position, brake pedal position, shift selector position; vehicle dynamic conditions such as acceleration rate or deceleration rate; EVT operational conditions such as temperatures, voltages, currents and speeds.

To_des may also comprise the system constrained output torque target for the control. It may correspond to the torque requested by the vehicle operator in the event that the request is within the system's capabilities. But it may correspond to a constrained output torque which is commanded to system in accordance with system limits. To_des may also be constrained in accordance with other factors apart from system capabilities such as vehicle driveability and stability considerations. Constrained output torques may be determined in accordance with minimum and maximum input torque capabilities at present operating conditions (Ti_min, Ti_max), minimum and maximum motor torques at present operating conditions (Ta_min, Ta_max, Tb_min, Tb_max) and minimum and maximum battery power capabilities at present operating conditions (Pbatt_min, Pbatt_max).

Through To or To_des, Ta and Tb are calculated, as well as Te as described above, and provided to their respective controller or controllers for implementation of the necessary control commands in such a manner as to produce the desired transmission output torque. To_des may be referred to herein as a command or To_cmd, even though it may exist primarily as an intermediate value and be resolved into control commands associated Ta, Tb and Te, namely Ta_cmd, Tb_cmd and Te_cmd, as described below. Additional details related to the operation of powertrain system 11 and the determination of To_des and To may be found in related, commonly assigned, co-pending U.S. Pat. No. 10/686,511 filed on Oct. 14, 2003 and Ser. No. 10/779,531 filed on Feb. 14, 2004, which are incorporated herein by reference in their entirety.

In addition to the factors listed above, it may also be desirable to adapt powertrain system 11 and To_des so as to either directly or indirectly take into account additional factors including the dynamic conditions associated with the road wheels and roadway surface. For example, tire types (e.g., tread pattern, tire composition) and conditions (e.g., tire wear, tire inflation), roadway types (e.g., paved, unpaved or other surfaces) and conditions (e.g., roadway temperature, state of repair, precipitation, foreign substances, etc.) and other factors. It is known that under certain combinations of the factors listed above (e.g., a high To_des and a wet or snow covered roadway) a wheel spin condition may occur, wherein To_des cannot be achieved as the To of the transmission. In order to adapt vehicle powertrain system 11 to various combinations of factors that may result in a wheel spin condition, vehicle powertrain system may be adapted to incorporate an automatic traction control to detect a wheel spin condition, temporarily override To_des_cmd, and provide a new traction control output torque command, To_trac_ cmd, that is adapted to reduce the output torque of the transmission and thereby eliminate the wheel spin condition, according to the method of the invention described herein.

Referring to FIGS. 5–10, the present invention comprises a method 100 for providing traction control by controlling the output torque of a vehicle powertrain system 200, such as vehicle powertrain system 11. While method 100 may be used with and is referred to herein in conjunction with powertrain system 11, it is believed to be applicable to many vehicle powertrain systems 200, particularly powertrain systems of various hybrid electric vehicles, and particularly those with transmissions that comprise an EVT.

Referring to FIGS. 5–8, method 100 comprises the steps of: monitoring 110 a vehicle powertrain system 200 for a wheel spin condition using a first controller 205; if a wheel spin condition is detected, sending 120 a plurality of first output torque command messages 210 from the first controller 205 to a second controller 215 that is adapted to determine a desired output torque 225, To_des, of the powertrain system 200 over a controller bus 220; determining 130 a reference output torque 230, To_ref, using To_des 225; determining 140 a plurality of traction control output torque commands 235, To_trac_cmd, corresponding to the plurality of first output torque command messages 210 as a function of To_ref 230; and controlling 150 the output torque, To, of the vehicle powertrain system, such as vehicle powertrain system 11, based on the plurality of traction control output torque commands 235. Method 100 may be implemented as plurality of steps or instructions in a computer or computers, and is preferably performed using first controller 205 and second controller 215, such as ATCM 45 and system controller 43.

Referring again to FIGS. 5, 7 and 8, method 100 comprises the step of monitoring 110 vehicle powertrain system 200, such as vehicle powertrain system 11, for a wheel spin condition using first controller 205. First controller 205 is also preferably a conventional automatic traction controller, such as ATCM 45. First controller 205 is preferably adapted to monitor and detect a wheel spin condition by monitoring the wheel speeds of the road wheels (not shown), including driven and undriven road wheels, using conventional wheel speed sensors 240 and applying conventional methods for detecting a wheel spin condition or event, such as, for example, by incorporating a control algorithm to identify an increase in the wheel speed of one of the driven wheels by more than a threshold value over an average or median wheel speed of the undriven wheels as a wheel spin condition. However, other means and methods of monitoring 110 and detection, such as known methods of monitoring 110 of certain acceleration characteristics of vehicle powertrain system, may also be used to detect a wheel spin condition within the scope of the present invention. The methods and criteria used to define a wheel spin condition are typically stored as a computer program 202 or programs and/or a calibratable value or plurality of values within first controller 205, and can be altered or adjusted depending on the desired dynamic performance characteristics of the particular vehicle powertrain system 200 in which method 100 is to be employed, using known control programs or algorithms and calibration methods.

Referring again to FIGS. 5, 7 and 8, if a wheel spin condition is detected, method 100 comprises a step of sending 120 a plurality of first output torque command messages 210 from the first controller 205 to a second controller 215 that is adapted to determine a desired output torque 225 of the powertrain system 200 over a controller bus 220. As noted above, it is preferred that first controller 205 is an automatic traction controller, such as ATCM 45, and that upon detection of a wheel spin condition it is adapted to provide a plurality of first output torque command messages 210 via controller bus 220, such as CAN bus 25. First output torque command messages 210 may comprise any suitable messages and be formulated and sent in accordance with any suitable data communications protocol or message format. However, it is preferred that the plurality of first traction control messages 210 comprise TSC1 ("Torque/Speed Control") messages which are determined and communicated in accordance with the standards set forth in SAE J1939-71. It is also preferred that the first traction control messages 210 includes a torque command parameter, such as the "Override Control Mode" parameter as defined in SAE J1939, and an execution priority parameter, such as the "Override Control Mode Priority" parameter defined in SAE J1939. Where first traction control messages 210 are TSC1 messages according to SAE J1939-71, the torque command parameter and execution priority parameter have the ranges of permissible values set forth in Table 1, as defined by SAE J1939-71.

TABLE 1

SAE J1939 Drivetrain Control Parameters

| | Parameter Identification | | | |
|---|---|---|---|---|
| Parameter | 00 | 01 | 10 | 11 |
| Override Control Mode | Override Disabled | Speed Control | Torque Control | Speed/Torque Limit Control |
| Override Control Mode Priority | Highest Priority | High Priority | Medium Priority | Low Priority |

In conventional traction controls and control methods, an ATCM, such as ATCM 45, sends TSC1 messages to an ECM, such as ECM 23. In accordance with current industry practice, it is preferred that the TSC1 messages from ATCM are addressed to ECM. The ECM is adapted to monitor a controller bus for the presence of TSC1 messages and implement control of engine 14 in response thereto using known methods. In accordance with conventional industry practice and hardware, the TSC1 110 messages from ATCM are sent with the Override Control Mode parameter set to "Speed/Torque Limit Control". This setting of the Override Control Mode parameter is a torque limit setting of this parameter, and is adapted to limit the output torque of the engine to a percentage of a fixed reference engine torque (typically a maximum engine output torque), rather than an actual torque command value, as described in SAE J1939.

While the TSC1 messages with the Override Control Mode parameter set to Speed/Torque Limit Control are well adapted and widely used to control vehicle powertrain systems comprising an internal combustion engine and transmission, the conventional use of SAE J1939 traction control hardware, software and message parameters is not suitable to directly provide traction control of a vehicle powertrain system of a hybrid electric vehicle, such as vehicle powertrain system 11. This is because the vehicle powertrain system of a hybrid electric vehicle, such as vehicle powertrain system 11, has additional inputs for controlling the output torque of the transmission that must be controlled in addition to an internal combustion engine, such as engine 14, namely, an electric machine or plurality of machines, such as is $M_A$ 56 and $M_B$ 72, as described herein, that are not adapted for control by the conventional implementation and use of TSC1 messages. Further, the fact that conventional commercial hardware is adapted to send TSC1 messages with the Override Control Mode parameter set to Speed/Torque Limit Control is undesirable even for direct control of the engine in a hybrid electric vehicle, because in order to optimize system performance it is typically desirable to command the engine to a particular engine output torque, Te, as described herein, rather than to a torque limit value. However, method 100 is adapted to utilize conventional commercial hardware for the ATCM and ECM, such as ATCM 45 and ECM 23, and a conventional communications protocol, such as the SAE J1939 protocol, as well as the conventional TSC1 messages available from the traction control with the Override Control Mode set to Speed/Torque Limit Control, and yet also fully utilize the torque output control flexibility of the hybrid electric vehicle to provide traction control for vehicle powertrain system 200, which includes an engine, an electric machine or machines and an EVT, as further described herein. This use of conventional traction control hardware and software noted above in conjunction with the implementation of method 100 in a vehicle powertrain system 200 is a particular advantage of the present invention.

Referring again to FIGS. 5, 7 and 8, in conjunction with the step of sending 120 first output torque command messages 210 to second controller 215, second controller 215 monitors controller bus 220 to detect the presence of first output torque command messages 210. This monitoring of the controller bus to detect the presence of first output torque command messages 210 may be performed using known hardware, software and control algorithms, such as those normally implemented in an engine controller, such as ECM 23. For example, monitoring of messages may be performed using a persistent counter which is adapted to determine the presence of one or more messages. Also, in conjunction with the step of sending 120 the plurality of first output torque command messages 210 to second controller 215, second controller 215 is adapted to receive, store and process each of the plurality of first output torque command messages 210 using well-known hardware and software for receiving, storing and processing such messages, as illustrated by block 300 of FIG. 8. As described above, second controller 200, such as system controller 43, is also adapted to continuously determine To_des 225 in conjunction with control loops executed by the system controller 215, as described herein, and as illustrated by block 310 of FIG. 8.

Figure 5:
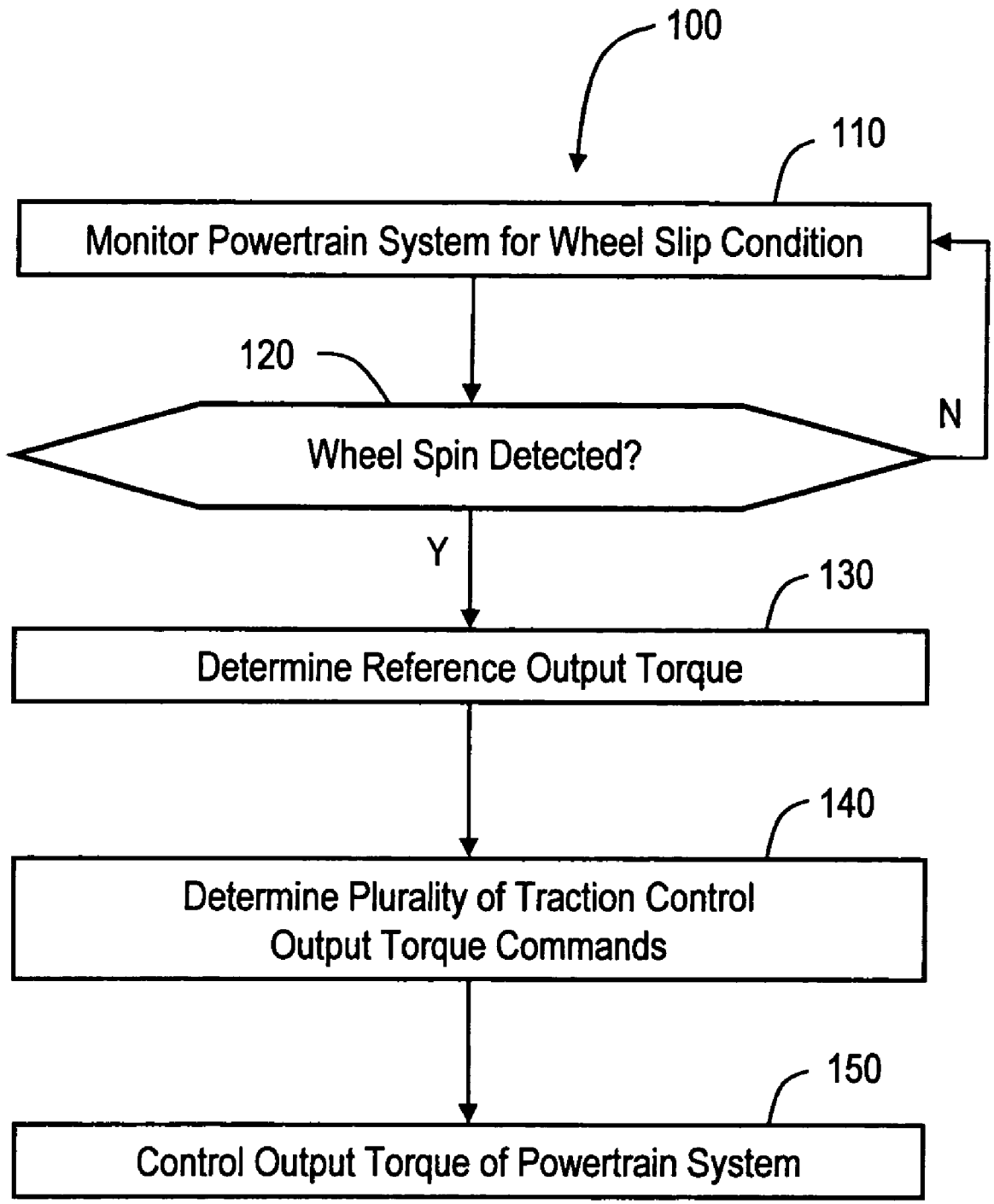
FIG. 5 is a flowchart illustrating the steps of the method of the present invention.
Figure 6A:
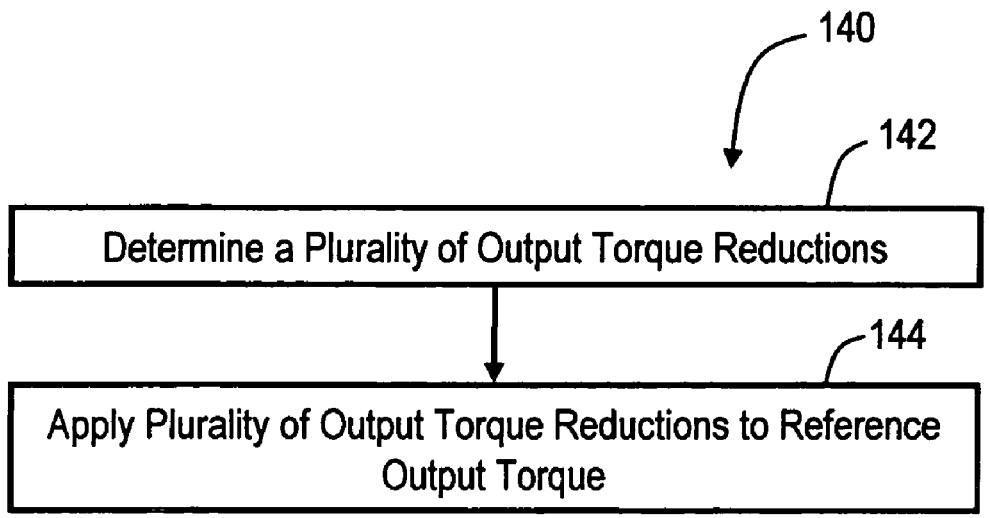
FIG. 6A is a flowchart further illustrating a step of the method of FIG. 5.
Figure 6B:
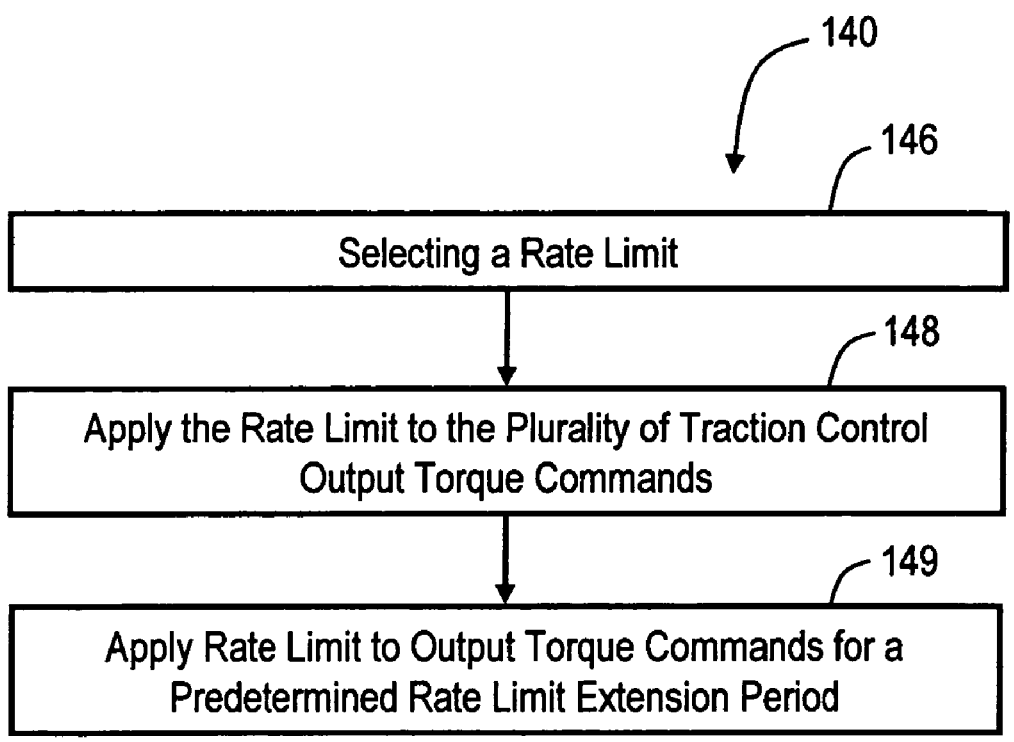
FIG. 6B is also a flowchart further illustrating a step of the method of FIG. 5.
Figure 7:
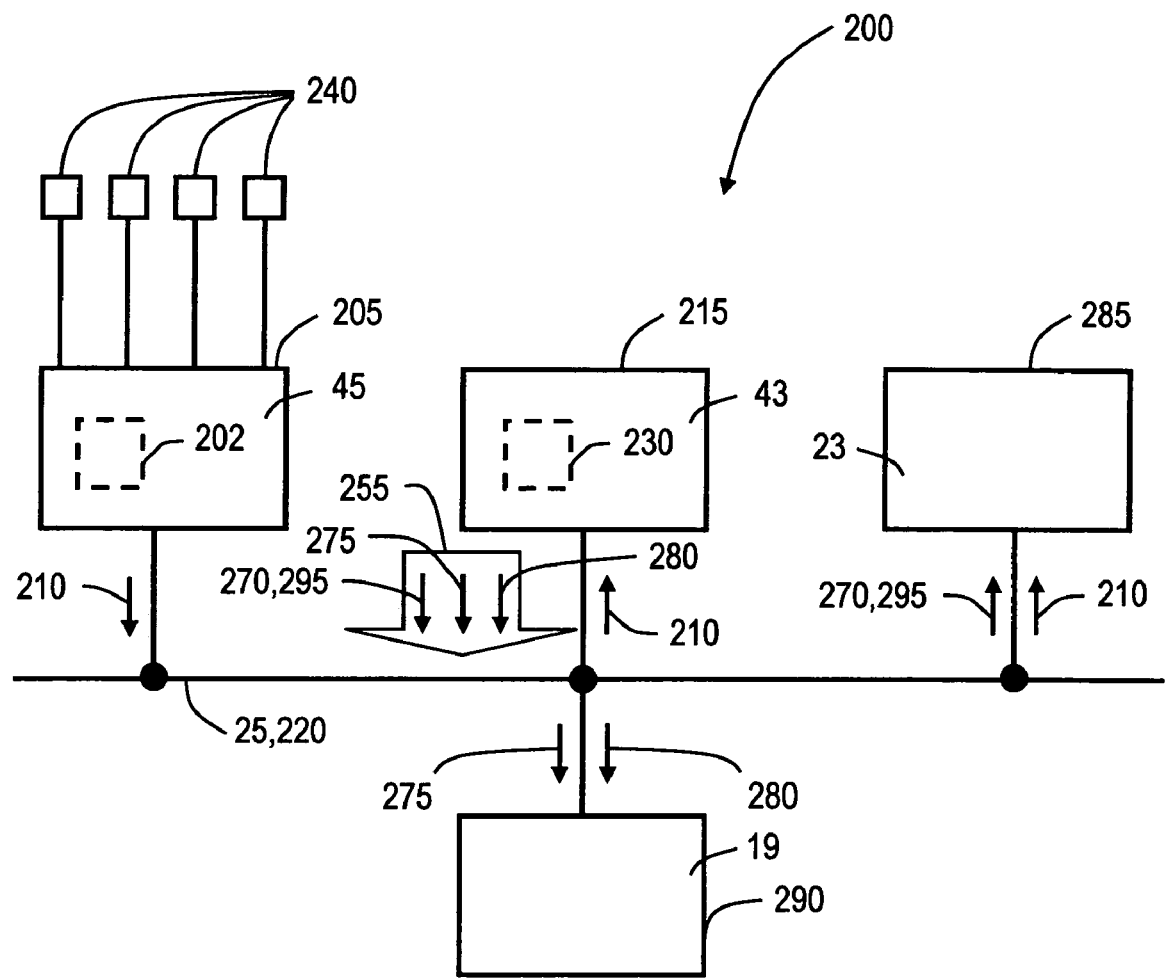
FIG. 7 is a block diagram illustrating information flow according to the method of the present invention.
Figure 8:
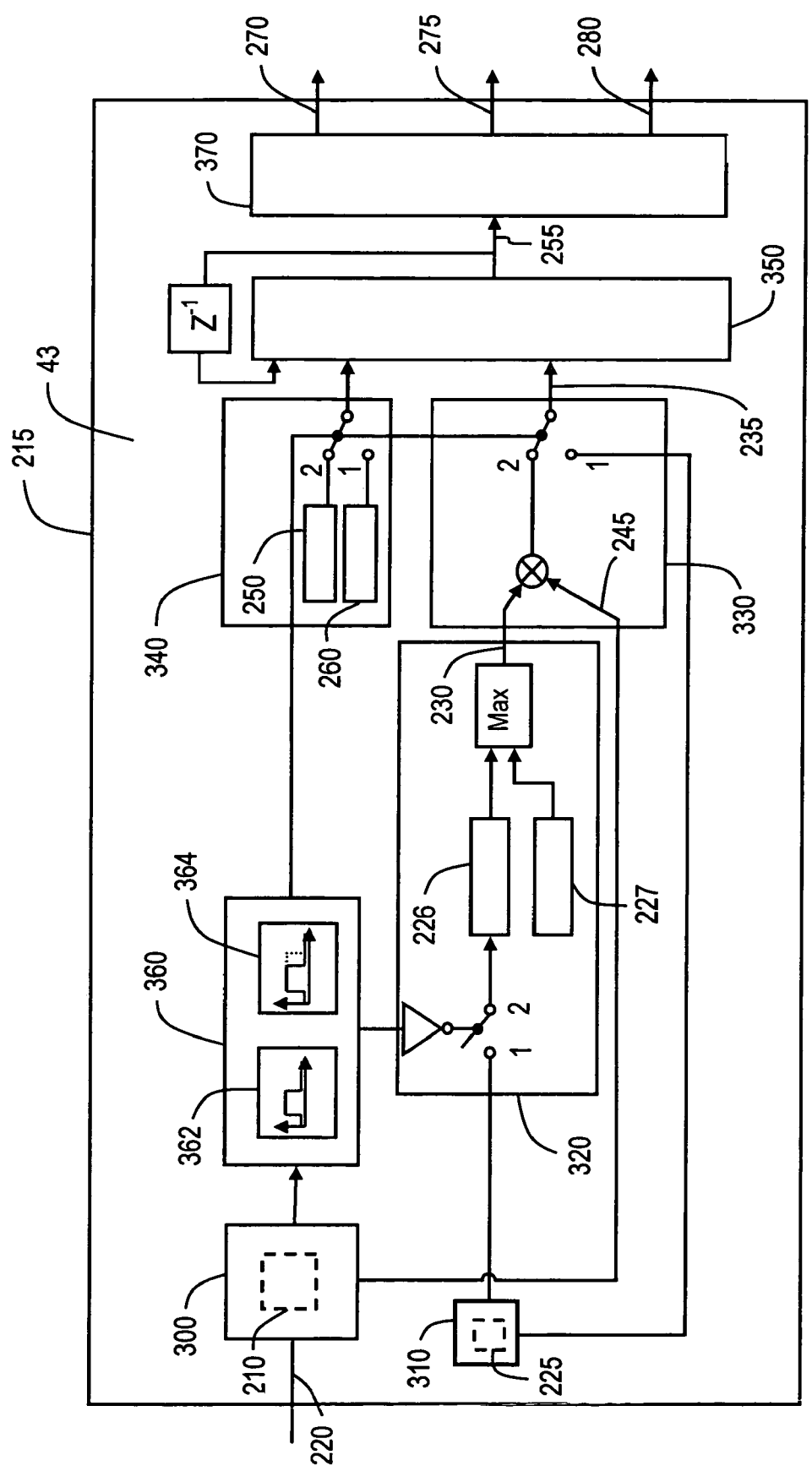
FIG. 8 is a block diagram illustrating the method of the invention.
Figure 9:
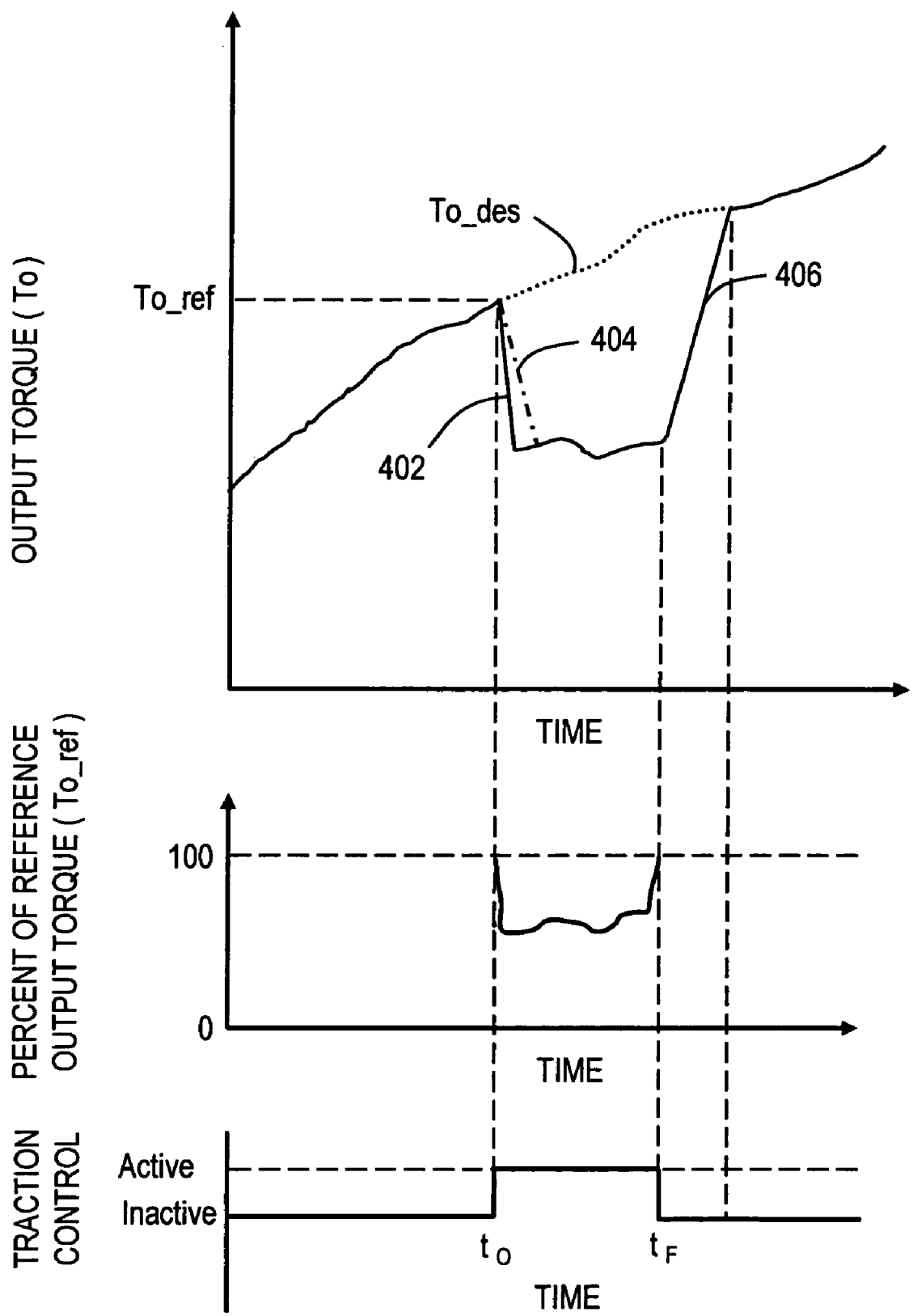
FIG. 9 is a graphic representation of a plot of output torque and the percentage of torque reduction as a function of time associated with a first embodiment of the method of the present invention.
Figure 10:
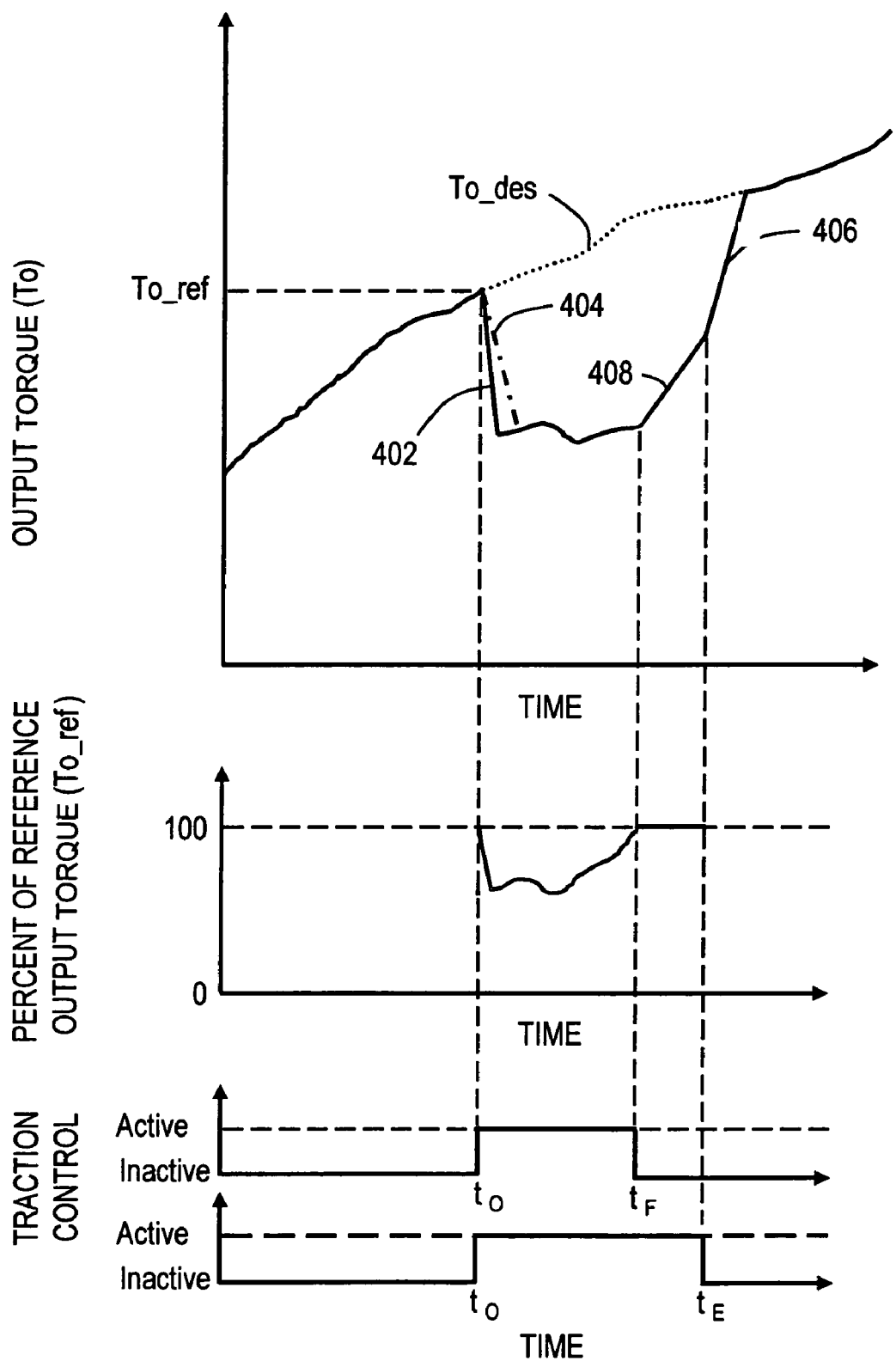
FIG. 10 is a graphic representation of a plot of output torque and the percentage of torque reduction as a function of time associated with a second embodiment of the method of the present invention.

Referring now to FIGS. 5, 7 and 8, method 100 also includes a step of determining 130 a reference output torque (To_ref) 230. To_ref 230 may be any reference output torque that is suitable for use in conjunction with the remainder of the steps of method 100 for determining a plurality of traction control output torque commands. However, it is preferred that To_ref comprise the To_des of the vehicle powertrain system, such as vehicle powertrain system 11, at a time, to, corresponding to the receipt of the first one of the plurality of first output torque command messages (To_des (to) 226), which corresponds to the onset of the wheel spin condition, as illustrated in FIGS. 9 and 10. If To_des is constrained as described herein, it is further preferred that To_ref comprise the constrained value or command associated with To_des. This is illustrated symbolically in block 320 of FIG. 8 by latching the value of To_des 225 that is provided continuously by system controller 215 at To_des (to) 226 by moving the switch shown in block 330 from position 1 to position 2 at time to to store a value for To_des(to) 226. This representation is only symbolic in nature for the purpose of illustration, and not representative of hardwired logic lines. The value of To_des(to) 226 is preferably stored in memory as a reference value by a computer in second controller 215. The reason for and advantages associated with this preference regarding the value of To_ref may be understood by contrasting the present invention with a conventional implementation of an automatic traction controller. In a conventional implementation of an automatic traction controller in a vehicle powertrain system consisting of an internal combustion engine and transmission, as has been described herein, the plurality of TSC 1 messages each contain a torque limit or torque reduction percentage identified in their respective torque command parameters. In such implementations, a TSC1 message is received by the engine controller and the respective torque reduction is applied to a fixed reference engine torque that is typically determined from a maximum engine output torque. In the present invention, To_ref is preferably determined to be the value of To_des at the onset of the wheel spin condition. To_ref is not only a more representative reference of the torque output of the vehicle powertrain system at the onset of the wheel spin condition, and thus a better basis against which to apply subsequent control actions, but the To_des associated with To_ref also has associated therewith operating points for both the engine and the electric machine or machines, such as Te, Ta and Tb in the case of vehicle powertrain system 11. As the control actions are applied to reduce To_des, effectively determining a new or override value of To_des associated with the wheel spin condition, new values for Te, Ta and Th can also be determined in the manner described herein.

It is further preferred that the value of To_ref be limited to values that are greater than a predetermined minimum reference output torque limit 227 (To_ref_limit). Therefore, it is preferred that the step of determining 130 To_ref further comprises a step of selecting the reference output torque from the greater of To_des(to) 226 and To_ref_limit 227. It is further preferred that To_ref_limit 227 be established as a value that is greater than zero, and that this value be dependent on the nature of the vehicle, such as for example, a value of about 678 n–m for vehicle 10.

Referring to FIGS. 5–8, method 100 also includes a step of determining 140 a plurality of traction control output torque commands 235 corresponding to the plurality of first output torque command messages 210 as a function of To_ref 230. Referring to FIG. 6A, this step of determining 140 may be accomplished for each traction control output command by the further steps of determining 142 an output torque reduction 245 from the corresponding first output torque command message 210; and applying 144 the output torque reduction 245 to the reference output torque 230 to determine the traction control output torque command 235.

This step is illustrated in block 330 of FIG. 8. In block 330, the switch shown therein is a symbolic representation, wherein position 2 of the switch is representative of a traction control operational state of second controller 215 wherein the traction control and method 100 is active and traction control output torque command is the commanded To of vehicle powertrain system 200. In this state, wherein the traction control is active, the normal operating state represented by switch position 1, wherein To_des 225 is the commanded To of vehicle powertrain system 200, is temporarily overridden for a time period corresponding to the duration of the wheel spin condition. This transition from the normal operating state to the activation of the traction control operating state is also illustrated in FIGS. 9 and 10. It will be understood by those of ordinary skill that the change in operational state represented by the switch in block 330 may correspond to any suitable means of adapting second controller 215 to switch the basis of control from To_des to To_trac_cmd, including means utilizing hardware, software or combinations thereof. It is preferred that this change in the operational state be implemented using a computer control algorithm that is triggered by the receipt of the first output torque command messages by second controller 215 as illustrated and described herein regarding block 300. Such means are well known.

In the case where first output torque command messages 210 comprise TSC1 messages in accordance with SAE J1939-71, as described herein, determining 142 the output torque reduction 245 comprises obtaining output torque reduction 245 from the Override Control Mode parameter of each of the TSC1 messages 210 from the limit value included therein in accordance with SAE J1939 when this parameter is set to Speed/Torque Limit Control, as described above. As noted above, TSC1 messages from a conventional ATCM, such as ATCM 45, typically set the Override Control Mode parameter to "Speed/Torque Limit Control" and then, in accordance with J1939-71, set the torque limit as a percentage reduction of output torque which is to be applied against a reference output torque value. Output torque reduction 245 may be obtained from the first output torque command messages 210 using known methods. The step of applying 144 the output torque reduction 245 to To_ref 230 to determine the To_trac_cmd 235 may then simply comprise multiplying the percentage reduction by To_ref 230 to obtain To_trac_cmd 235. Thus, for each of first output torque command messages 210 a corresponding To_trac_cmd 235 may be determined. Since ATCM 45 is adapted to remain active and transmit first torque command messages 210 messages in accordance with SAE J1939 for the duration of a wheel spin condition, which corresponds to the time interval from time to to time tF as shown in FIGS. 9 and 10, method 100 is adapted to provide a corresponding plurality of reduced traction control output torque commands 235 for the duration of the wheel spin condition, as illustrated in FIGS. 8–10.

Referring to FIGS. 6B, 8, 9 and 10, it is preferred that the step of determining 140 a plurality of traction control output torque commands 235 also comprise the step of selecting 146 a traction control rate limit 250 to limit a magnitude of a change in successive ones of the plurality of traction control output torque commands 235, followed by the step of applying 148 the traction control rate limit 250 to each of the traction control output torque commands 235 to determine a corresponding plurality of rate limited traction control output torque commands 255. As the output torque reduction 245 received from the plurality of first output torque command messages 210 can change abruptly in response to changes in the wheel speeds, particularly transitions associated with the onset or end of a wheel spin condition as shown in FIGS. 9–10, it is desirable to limit the magnitude of the change between successive ones of the plurality of traction control output torque commands 235, particularly so as to prevent the extension of or recurrence of a wheel spin condition by applying an excessive amount of torque in conjunction with any of the plurality of traction control output torque commands 235.

The step of selecting 146 the traction control rate limit 250 is illustrated symbolically in block 340 of FIG. 8 by the selection of position 2 of the switch located therein, wherein position 2 of the switch is representative of the activation of the traction control operational state of second controller 215, as described herein. In this state, wherein the traction control is active, the normal operating state, represented by switch position 1, wherein a normal state rate limit 260 is selected for application to To_des 225, is temporarily overridden, as described herein.

It is preferred that the rate limit 250 comprise a positive rate limit which when the traction control output torque command is increasing between successive ones of the plurality of traction control output torque commands, and a negative rate limit when the traction control output torque command is decreasing between successive ones of the plurality of traction control output torque commands 235. Rate limit 250 also preferably has a value or values that vary as a function of vehicle parameters, such as vehicle speed and output torque, and may be expressed in relation to the normal rate limit 260 associated with the application of output torque. For example, in one embodiment of the invention, the traction control positive rate limit was approximately one tenth of the normal positive rate limit 260, and the traction control negative rate limit was approximately two times greater than the normal negative rate limit 260. Rate limit 250 may be determined empirically for a given vehicle powertrain system 200 using known methods and incorporated in the second controller 215 as a stored value or calibration setting. Since the successive ones of the first torque output command messages are typically transmitted at fixed intervals, for example 10 ms intervals in the case of TSC1 messages according to SAE J1939, the application of the traction control rate limit and the interval length determines a maximum magnitude of change in the To_trac_cmd 235 between successive ones of the plurality of traction control output torque commands 235. The step of applying 148 the traction control rate limit 250 to determine a corresponding plurality of rate limited traction control output torque commands 255 may be performed by any suitable method, and is illustrated by block 350 in FIG. 8. Preferably, a comparison is made between two output torque quantities comprising the output torque quantity associated with the traction control output command (To_trac_cmd(0)) calculated by applying the output torque reduction 245 to the reference output torque 230 and the output torque quantity associated with the immediately preceding traction control output torque command (To_trac_cmd (−1)) (illustrated in FIG. 8 as $Z^{-1}$) plus the change in output torque determined as a function of rate limit 250. In the case where the traction control output torque command is decreasing between successive commands, the negative rate limit is used, and the greater of these quantities is selected as rate limited traction control output torques command 255. In the case where the traction control output torque command is increasing between successive commands, the positive rate limit is used, and the lesser of these quantities is selected as the rate limited traction control output torque command 255. Applicants have also determined empirically that it is generally preferred that the absolute value of the negative rate limit is greater than that of the positive rate limit in order to accommodate vehicle passenger and operator preferences for vehicle feel and handling associated with changes in the vehicle output torque, improve vehicle responsiveness to wheel spin events, and enhance stability of vehicle output torque in response to the degree of wheel spin.

Referring to FIGS. 8–10, method 100 may also comprise a step of applying 149 the rate limit 250 for a predetermined rate limit extension period 265 following the determining of a last one of the plurality of traction control output torque command messages 210. This is illustrated symbolically in block 360 of FIG. 8. Block 360 illustrates the determination of the duration for which traction control and method 100 is active. As described above, first controller 205, such as ATCM 45, is adapted to transmit first output torque command messages 210 for an interval corresponding to the onset and end of a detected wheel spin condition. This interval corresponds to the period of time between time to and time tF as illustrated in FIG. 9, and defines the duration for which traction control and method 100 is active based on the first traction control output torque command messages 210 received from first controller 205. Traction control and method 100 may be implemented in a first mode such that it is active only for this interval, referred to herein as Mode 1 and in FIG. 8 as block 362. However, applicants have also identified a second mode of implementing traction control and method 100, referred to herein as Mode 2 and illustrated in FIG. 8 as block 364, which comprises the step of applying 149 the rate limit 250 for a predetermined rate limit extension period 265 following the determining of a last one of the plurality of traction control output torque command messages 210. Mode 2 operation is illustrated in FIG. 10, wherein the interval for which traction control is active is determined by the period of time between time to and time tE. The interval between tF and tE is predetermined rate limit extension period 265. Mode 2 operation is generally believed to be preferred to Mode 1 operation. The advantages benefits of Mode 2 operation of traction control are described below.

Normal state rate limit 260 will preferably comprise a positive rate limit when To is increasing and a negative rate limit when To is decreasing, which range in absolute value from about 500–1350 n–m/sec. Normal state rate limits 260 are preferably different than traction control rate limits 250, because they have different purposes and objectives with respect to achieving desirable vehicle handling and performance characteristics, such as the accelerations experienced by passengers and operators, such that in the normal operating state the absolute value of the negative rate limits 260 are lesser and the absolute value of the positive rate limits 260 are greater than those of the respective negative and positive traction control rate limits 250. This is illustrated in FIG. 9, wherein line segment 402 illustrates the result of application of a traction control negative rate limit at time to. The change that would result if a normal state rate limit was applied at time to is illustrated by line segment 404. The application of the negative traction control rate limit permits a faster reduction of the output torque, and a faster control response to the wheel spin condition. Line segment 406 illustrates the application of the normal state positive rate limit from time tF when the last one of the plurality of first output torque command messages is received and traction control, and the application of positive traction control rate limit 250, becomes inactive. Applicants have observed that application of normal rate limits following a wheel spin condition may cause an extension of the existing condition or a recurrence of a new wheel spin condition. Therefore, in order to further reduce the possibility that a new wheel spin condition will recur at the end of an existing wheel spin condition, applicants have determined that it is preferable to extend the traction control state and the application of the traction control rate limit 250, particularly the positive traction control rate limit, for a predetermined rate limit extension period 255 following the receipt of the last one of the plurality of first torque output command messages 210, which defines the end of a given wheel spin condition. This may be accomplished by using second controller 215 to continue the application of the control steps of method 100 applied during the wheel spin condition for a predetermined rate limit extension period 265 following the receipt of the last one of the plurality of first output torque command messages 210, such as, for example, 0.5 secs. In order to extend the application of the control steps, the value of To_ref continues to be stored by system controller 200 for the predetermined rate limit extension period 265. In this case, since no first output torque command messages 210 are being received, no output torque reductions can be determined therefrom, so the value of the output torque reduction 245 during the predetermined rate limit extension period 265 is set to 100 percent (i.e., no reduction), or a multiplier of 1. Therefore, To_trac_cmd 235 during the extension period equals To_ref 230. Then the positive traction control rate limit 250 may be applied in the manner described herein for the predetermined rate limit extension period. This is illustrated in FIG. 10 and corresponds to Mode 2 operation. In FIG. 10, line segment 408 corresponds to application of the positive traction control rate limit 250, and line segment 406 corresponds to the application of the positive normal state rate limit 260 after the expiration of the predetermined rate limit extension period 265.

Referring to FIGS. 5 and 7, method 100 also includes a step of controlling 160 the torque output of a vehicle powertrain system 205, based on the plurality of traction control output torque commands 235. As described herein, it is preferred that traction control rate limits 250 be applied to these commands so as to produce rate limited traction control commands 255, and that control of vehicle powertrain system is affected based upon rate limited traction control commands 255. As noted above, each one of traction control output torque commands 235 is in effect an override value or traction control value of To_des which has been reduced in order to eliminate the associated wheel spin condition. Therefore, associated values of output torque for the engine and the electric machine or machines, such as Te, Ta and Tb in the case of powertrain system 11 may be determined from the traction control output torque commands 235, preferably the rate limited traction control commands 255, in the manner described herein for determining To_des, and corresponding control commands Te_cmd 270, Ta_cmd 275 and Tb_cmd 280 may be determined and sent by second controller 215, such as system controller 43, to the engine controller 285, such as ECM 23, electric machine controller 290, such as PIM 19, as shown in FIGS. 7 and 8. The determination of Te_cmd 270, Ta_cmd 275 and Tb_cmd 280 from rate limited To_trac_cmd 255 is illustrated by block 370 in FIG. 8.

In the case of engine controller 285, such as ECM 23, and Te_cmd 270, it is preferred that Te_cmd be sent to engine controller 285 as a plurality of second output torque command messages 295, such as TSC1 messages over controller bus 220. The plurality of second output torque command messages 295 correspond to the plurality of rate limited traction control output torque commands 255, and hence, also correspond to the plurality of first output torque command messages 210. Therefore, the engine ECM receives a plurality of TSC1 messages from ATCM 45 and system controller 43 in response to a wheel-spin condition. In order to avoid conflict with the first output torque command messages 210, such as TSC1 messages sent by ATCM 45, it is preferred that the plurality of second output torque command messages 295, such as TSC 1 messages sent by system controller 43, be sent with a higher priority for execution than first output torque command messages 210. The second output torque command messages 295, such as TSC1 messages sent by system controller 43 are, therefore, set with the highest possible priority (i.e., TSC1 messages with the Override Control Mode Priority parameter in these message set equal to "11", or the highest priority), or at a minimum, a higher priority than those of first output torque command messages 210. If the execution priority parameters of the first output torque command messages 210, such as TSC1 message sent by ATCM 45, have any value other than the highest priority, engine controller 285, such as ECM 23, selects the plurality of second output torque command messages 295 for execution. Such a prioritization scheme is described more fully in SAE J1939-71. In the case of hybrid electric vehicle powertrain system 200, such as powertrain system 11, it is desirable that Te_cmd 270 constitutes a specific engine output torque or speed command, rather than a limit, as described herein. Therefore, it is desirable that the torque command parameter of the plurality of second output torque command messages comprise an engine torque or speed command, rather than a limit value or torque reduction (i.e., TSC1 messages with the Override Control Mode parameter set equal to "01" for "Speed Control" or "10" for "Torque Control"). In the case of TSC1 messages, this also provides a means for resolution of any conflict in the event that the execution priority parameters of both the first output torque command messages 210 and second output torque command messages 295 are the same, because according to SAE J1939, the Speed Control or Torque Control settings of the Override Control Mode parameter have a higher priority for execution than the Speed/Torque Limit Control setting of this parameter.

Further scope of applicability of the present invention will become apparent from the drawings and this detailed description, as well as the following claims. However, it should be understood that the detailed description and specific examples, while indicating preferred embodiments of the invention, are given by way of illustration only, since various changes and modifications within the spirit and scope of the invention will become apparent to those skilled in the art.

The invention claimed is:

1. A method for providing traction control of a vehicle powertrain system, comprising:
monitoring a vehicle powertrain system for a wheel spin condition using a first controller;
if a wheel spin condition is detected, sending a plurality of first output torque command messages from the first controller to a second controller that is adapted to determine a desired output torque of the powertrain system over a controller bus;
determining a reference output torque using the desired output torque;
determining a plurality of traction control output torque commands corresponding to the plurality of first output torque command messages as a function of the reference output torque; and
controlling a torque output of the vehicle powertrain system based on the plurality of traction control output torque commands.

2. The method of claim 1, wherein the reference output torque is determined using the desired output torque at a time corresponding to receipt of a first one of the plurality of first output torque command messages.

3. The method of claim 2, further comprising:
selecting the reference output torque from the greater of the desired output torque and a preselected minimum reference output torque limit.

4. The method of claim 3, wherein the preselected minimum reference output torque limit is greater than zero.

5. The method of claim 1, wherein determining each of the traction control output torque commands, further comprises:
determining an output torque reduction from the corresponding first output torque command message; and
applying the output torque reduction to the reference output torque to determine the traction control output torque command.

6. The method of claim 1, further comprising:
selecting a rate limit to limit a magnitude of a change in successive ones of the plurality of traction control output torque commands.

7. The method of claim 6, wherein the rate limit comprises a positive rate limit when the traction control output torque command is increasing between successive ones of the plurality of traction control output torque commands and a negative rate limit when the traction control output torque command is decreasing between successive ones of the plurality of traction control output torque commands.

8. The method of claim 7, wherein the absolute value of the negative rate limit is greater than the absolute value of the positive rate limit.

9. The method of claim 6, further comprising:
applying the rate limit to each of the traction control output torque commands to determine a corresponding plurality of rate limited traction control output torque commands.

10. The method of claim 9, further comprising:
applying the rate limit for a predetermined rate limit extension period following the determining of a last one of the plurality of traction control output torque command messages.

11. The method of claim 1, wherein the vehicle powertrain system comprises an internal combustion engine, an electric machine, and a transmission that is operatively coupled to the electric machine and the engine and adapted to provide a transmission torque output, wherein the torque output of the vehicle powertrain system is the transmission torque output.

12. The method of claim 11, wherein each of the plurality of traction control output torque commands is used to determine an engine torque output command and an electric machine torque output command.

13. The method of claim 11, wherein the first controller is a traction controller that is adapted to detect a wheel spin condition and provide the plurality of first output torque command messages in response thereto and the second controller is a system controller that is adapted to control the transmission torque output.

14. The method of claim 5, wherein determining the output torque reduction from the corresponding first output torque command message is accomplished using a first output torque command parameter contained within the corresponding first output torque command message.

15. A method for providing traction control of a vehicle powertrain system comprising an internal combustion engine, an electric machine, a transmission that is operatively coupled to the electric machine and the engine and adapted to provide a transmission torque output in response to a transmission torque input received as a torque output from either or both of the engine and the electric machine, a system controller that is adapted to determine a desired output torque and control an output torque of the transmission therewith, a traction controller that is adapted to detect a wheel spin condition and provide a plurality of first output torque command messages in response thereto, and a controller bus that is adapted to provide the plurality of first output torque command messages from the traction controller to the system controller, comprising:

monitoring the vehicle powertrain system for a wheel spin condition using the traction controller;

if a wheel spin condition is detected, sending the plurality of first output torque command messages from the traction controller to the system controller over the controller bus;

determining a reference output torque using the desired output torque;

determining a plurality of traction control output torque commands corresponding to the plurality of first output torque command messages as a function of the reference output torque; and controlling the output torque of the vehicle powertrain system based on the plurality of traction control output torque commands.

16. The method of claim 15, wherein the reference output torque is determined using the desired output torque at a time corresponding to receipt of a first one of the plurality of first output torque command messages.

17. The method of claim 16, further comprising:
selecting the reference output torque from the greater of the desired output torque and a preselected minimum desired output torque limit.

18. The method of claim 17, wherein the preselected minimum desired torque output limit is greater than zero.

19. The method of claim 15, wherein determining each of the traction control output torque commands, further comprises:

determining a output torque reduction from the corresponding first output torque command message; and applying the output torque reduction to the reference output torque to determine the traction control output torque command.

20. The method of claim 15, further comprising:
selecting a rate limit to limit a magnitude of a change in successive ones of the plurality of traction control output torque commands.

21. The method of claim 20, wherein the rate limit comprises a positive rate limit when the traction control output torque command is increasing between successive ones of the plurality of traction control output torque commands and a negative rate limit when the traction control output torque command is decreasing between successive ones of the plurality of traction control output torque commands.

22. The method of claim 21, wherein the absolute value of the negative rate limit is greater than the absolute value of the positive rate limit.

23. The method of claim 20, further comprising:
applying the rate limit to each of the plurality of traction control output torque commands to determine a corresponding plurality of rate limited traction control output torque commands.

24. The method of claim 23, further comprising:
applying the rate limit for a predetermined rate limit extension period following the determining of a last one of the plurality of traction control output torque command messages.

25. The method of claim 15, wherein the vehicle powertrain system further comprises an engine controller that is adapted to control a torque output of the engine in response to an engine torque output command and an electric machine controller that is adapted to control a torque output of the electric machine in response to an electric machine torque output command, and wherein each of the plurality of traction control output torque commands is used to determine a corresponding traction control engine torque output command and a corresponding traction control electric machine torque output command.

* * * * *